United States Patent [19]

Iwamura

[11] Patent Number: 5,343,250
[45] Date of Patent: Aug. 30, 1994

[54] MULTIPLE PICTURE/SOUND SIGNALS DECODING APPARATUS

[75] Inventor: Ryuichi Iwamura, Tokyo, Japan
[73] Assignee: Sony Corporation, Japan
[21] Appl. No.: 47,109
[22] Filed: Apr. 13, 1993

[30] Foreign Application Priority Data

Apr. 16, 1992 [JP] Japan .................. 4-096743

[51] Int. Cl.$^5$ .................. H04N 5/45; H04N 7/13
[52] U.S. Cl. .................. 348/564; 348/400
[58] Field of Search .................. 358/180, 183, 22 AP, 358/230, 140, 136, 138; 348/564, 400, 581; H04N 5/45, 7/13

[56] References Cited

U.S. PATENT DOCUMENTS 4,878,117 10/1989 Ikehira et al. .................. 358/183
4,930,014 5/1990 Maeda et al. .................. 358/180 X
5,047,858 9/1991 Aimonoya .................. 358/183

*Primary Examiner*—Victor R. Kostak
*Attorney, Agent, or Firm*—Limbach & Limbach

[57] ABSTRACT

A multiple picture/sound signals decoding apparatus having a reduced-scale structure and capable of reproducing multiple moving pictures simultaneously on a single display device. For decoding input signals such as multiple moving picture signals and sound signals read out from a recording medium or those received via transmission lines, the apparatus includes at least one decoder for curtailing the input picture signals at a predetermined interval to produce multiple picture signals reduced both horizontally and vertically, and decoding each of such multiple picture signals; frame memories connected to at least one decoder; a display for displaying the multiple pictures simultaneously on a single screen; and a controller for controlling the operations of the one or more decoders and the display. In response to a mode selection signal, the controller selects a multiple moving picture mode for displaying the reduced multiple moving pictures simultaneously on a single screen of the display means, or a single moving picture mode for displaying merely one of the multiple moving pictures on the screen of the display.

10 Claims, 16 Drawing Sheets

F I G. 4(a)

| XV1 | XV2 |
|---|---|
| XV3 | |

1109

F I G. 4(b)

| YV1 | YV2 |
|---|---|
| YV3 | |

1110

F I G. 4(c)

| ZV1 | ZV2 |
|---|---|
| ZV3 | |

1111

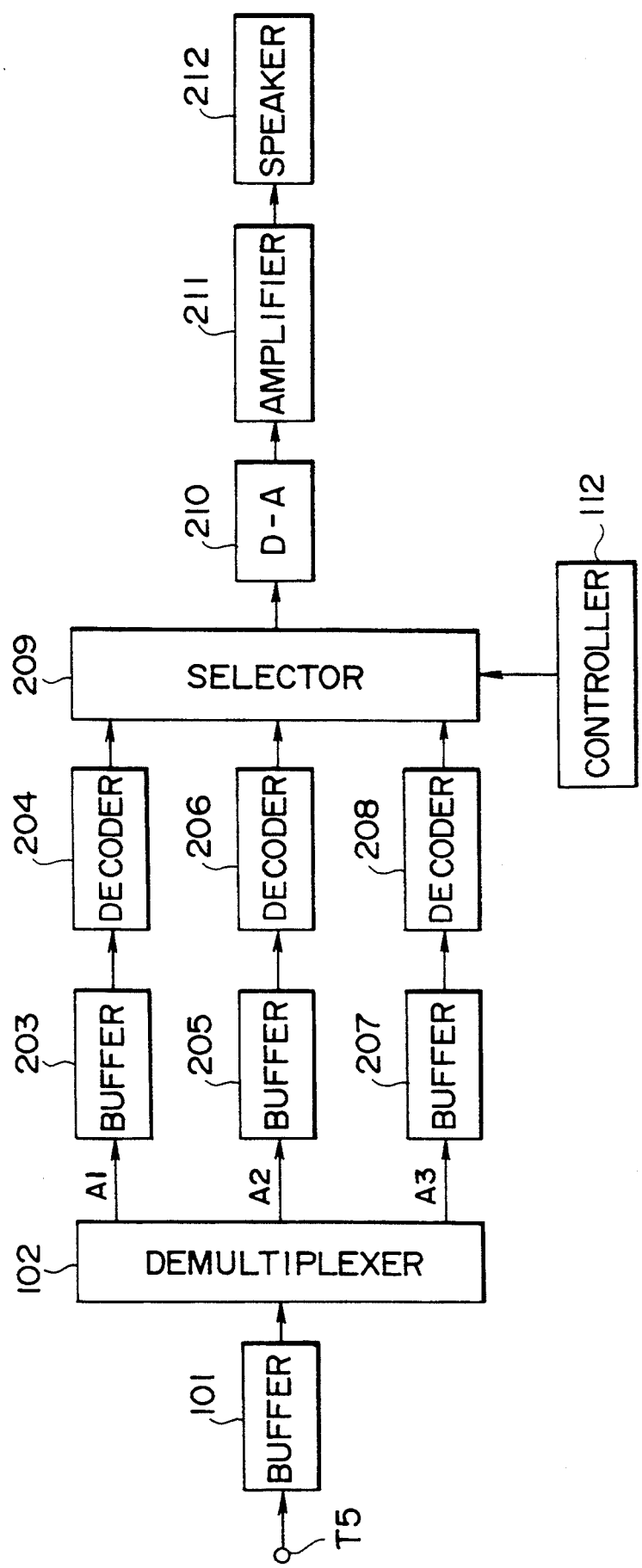

FIG. 10

| V1 | I0 B1 P2 B3 P4 B5 P6 B7 P8 B9 P10 |
|---|---|
| V2 | I0 I1 B2 P3 B4 P5 B6 P7 B8 P9 B10 |
| V3 | I0 B1 P2 B3 I4 B5 P6 B7 P8 B9 P10 |

FIG. 11

| V1 DECODING | I0 P2 B1 P4 B3 P6 B5 P8 B7 P10 B9 | | | |
|---|---|---|---|---|
| XV1 | I0 | P4 | | P8 |
| YV1 | / | P2 | P6 | P10 |

FIG. 12

| V2 DECODING | I0 I1 P3 B2 P5 B4 P7 B6 P9 B8 | | | |
|---|---|---|---|---|
| XV2 | I0 | P3 | | P7 |
| YV2 | / | I1 | P5 | P9 |

FIG. 13

| V3 DECODING | I0 P2 B1 I4 B3 P6 B5 P8 B7 P10 B9 | | | |
|---|---|---|---|---|
| XV3 | I0 | I4 | | P8 |
| YV3 | / | P2 | P6 | P10 |

| ZV1 | I0 B1 P2 B3 P4 B5 P6 B7 P8 B9 |
| --- | --- |
| ZV2 | I0 I1 B2 P3 B4 P5 B6 P7 B8 P9 |
| ZV3 | I0 B1 P2 B3 I4 B5 P6 B7 P8 B9 |

FIG. 21
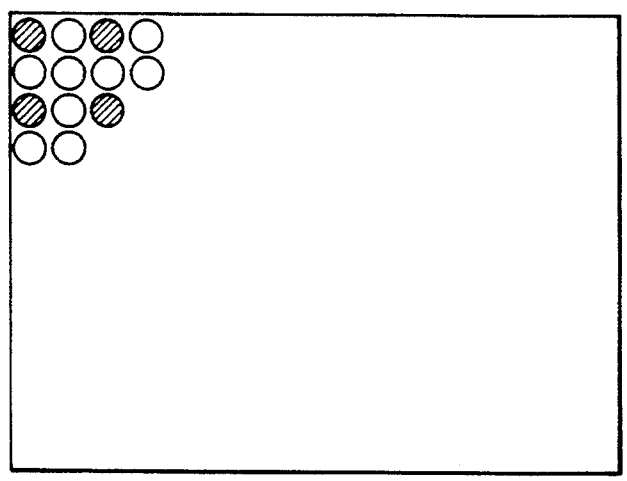
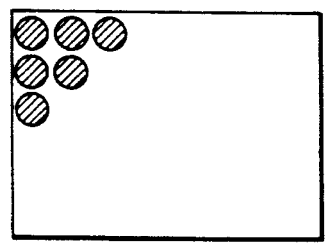

MULTIPLE PICTURE/SOUND SIGNALS DECODING APPARATUS

BACKGROUND OF THE INVENTION

1. Field of the Invention

The present invention relates to an apparatus for decoding multiple moving picture signals and sound signals, and more particularly, to a decoding apparatus based on the MPEG (Moving Picture Experts Group) system.

2. Description of the Related Art

Prior to giving a description with regard to the conventional multiple picture/sound signals decoding apparatus based on the MPEG system, a general encoding method and apparatus will be explained.

To begin with, an interframe motion predicting method in the MPEG system will be described below with reference to FIG. 15. In this diagram, first a predictive-coded frame P0 is predicted from an intracoded frame I0. Subsequently a bidirectionally predictive-coded frame B0 is predicted from the two frames I0 and P0. And similarly another bidirectionally predictive-coded frames B1 is predicted from the intracoded frame I0 and the predictive-coded frame P0. For prediction of the bidirectionally predictive-coded frames B0 and B1, there are known three modes such as forward prediction from the predictive-coded frame P0, backward prediction from the intra-coded frame I0, and interpolative prediction executed bidirectionally as mentioned above. And in practice, the most adequate one for data compression is selected out of such three modes.

Hereinafter such intra-coded frame, forward predictive-coded frame and bidirectionally predictive-coded frame will be referred to as I frame, P frame and B frame, respectively. Now a description will be given on an exemplary apparatus for compression coding and decoding signals of multiple moving pictures and sounds by the MPEG system. FIG. 16 is a block diagram of a multiple picture/sound signals encoding apparatus which is capable of multiplexing and encoding three moving pictures and three sounds.

In FIG. 16, a digital moving picture signal V1 inputted to a terminal Ta is supplied via a compression encoder 1 and a buffer 2 to a multiplexer 13. Meanwhile, moving picture signals V2 and V3 inputted to terminals Tb and Tc respectively are supplied via compression encoders 3 and 5 and via buffers 4 and 6, respectively to the multiplexer 13. A sound signal A1 of the moving picture signal V1 is inputted to a terminal Td and then is supplied via a compression encoder 7 and a buffer 8 to the multiplexer 13. Similarly, sound signals A2 and A3 are supplied via compression encoders 9 and 11 and via buffers 10 and 12, respectively to the multiplexer 13.

Subsequently such signals are multiplexed by the multiplexer 13, whose output is then delivered via a buffer 14 to a terminal Tg and is further supplied to a storage medium or a transmission line. FIG. 17 shows an exemplary data arrangement of the output signal obtained from the terminal Tg. The three moving picture signals and the three sound signals thus compression-coded are multiplexed in the direction of the time base, as shown in FIG. 17. FIG. 18 is a block diagram of the moving picture compression encoder shown in FIG. 16. This encoder is of a general type equipped with a combination of a DCT (discrete cosine transformer) and an interframe predictor. In FIG. 18, a moving picture signal a fed to a video input terminal T1 is stored in a frame memory 21 and then is supplied to a subtracter 22 in the next stage. The output of the subtracter 22 is an interframe predictive difference signal which represents the difference between the input picture signal supplied to the positive terminal of the subtracter 22 and the predictive picture signal supplied to the negative terminal thereof.

The interframe predictive difference signal is supplied via a DCT 23 and a quantizer 24 to two transmission lines.

The signal from one transmission line is inputted to a variable length encoder 25 and then is multiplexed with motion vector data d and so forth in a multiplexer 26, and the multiplexed signal is delivered as an encoder output e from an output terminal T2 via a buffer 27. Meanwhile the signal from the other transmission line is processed in an inverse quantizer 28, an inverse DCT 29 and an adder 30, and then is outputted as a decoded picture signal b. Subsequently the picture signal b is inputted via a frame memory selector switch SW1 to frame memories 31 and 32.

A motion vector calculator 33 generates a motion vector d on the basis of the input data obtained from the frame memories 21, 31 and 32.

A predictive picture generator 34 generates a predictive picture signal c on the basis of both the motion vector data d obtained from the motion vector calculator 33 and the picture signal stored in the frame memories 31 and 32.

The predictive picture signal c is supplied to the negative terminal of the subtracter 22 via a switch SW2 while being supplied also to the adder 30 via a switch SW3. When the decoded picture signal b relative to the I and P frames, the switch SW1 is changed alternately so that local decoded picture signals of the I and P frames are supplied to the frame memories 31 and 32.

The switches SW2 and SW3 are closed in the P and B frames where the motion is predicted, and a subtraction and an addition for prediction of the picture are executed in the subtracter 22 and the adder 30, respectively. The switches SW2 and SW3 are open in the I frame where the motion is not predicted, so that none of a subtraction and an addition for prediction of the picture is executed in the subtracter 22 and the adder 30. FIG. 19 shows a conventional multiple picture/sound signals decoding apparatus which is complementary to the multiple picture/sound signals encoding apparatus of FIG. 16.

In FIG. 19, a multiplexed code obtained from a terminal Tg' is supplied via a buffer 35 to an inverse multiplexer 36, where the multiplexed code is separated into three moving picture signals V1, V2, V3 and three sound signals A1, A2, A3. And such signals are supplied to respective decoders. The moving picture signal V1 is supplied via a buffer 37 to a decoder 38, and the decoded signal therefrom is supplied to a D-A converter 39 where digital-to-analog conversion is executed. And the analog signal thus obtained is supplied to a display device 40. Similarly the moving picture signals V2 and V3 are supplied via buffers 41 and 45, respectively to decoders 42 and 46, respectively so as to be decoded.

The sound signal A1 is supplied via a buffer 49 to a decoder 50, and the decoded signal therefrom is further supplied via a D-A converter 51 to a reproducer 52. Similarly the sound signals A2 and A3 are processed in the same manner. FIG. 20 is a block diagram of each of the decoders 38, 42 and 46 shown in FIG. 19. A signal e fed to an input terminal T3 is supplied via a buffer 61 to an inverse multiplexer 62, where the signal e is separated into the quantized moving picture signal and the motion vector data d. The compression-coded moving picture signal is decoded to an interframe predictive difference signal by a variable length decoder 63, an inverse quantizer 64 and an inverse DCT 65, and then is supplied to an adder 66. The adder 66 receives, besides such difference signal, a predictive picture signal inputted thereto via a switch SW5 from a predictive picture generator 69 on the basis of the data obtained from the frame memories 67 and 68, so that the two signals are added to each other to produce a decoded picture signal.

The decoded picture signal thus obtained is stored in the frame memory 67 or 68 to become the data for producing a predictive picture signal while being inputted to a frame selection switch 70. The switch SW4 is changed every time the I and P frames are decoded, and the switch SW5 is closed in the P and B frames where the motion is predicted. The switch SW5 is open in the I frame, so that the output of the predictive picture generator 69 is not added by the adder 66.

In the frame selection switch 70, the decoded pictures are arranged in the display sequence and then are outputted to a terminal T4.

In decoding and reproducing the compression-coded signals of multiple moving pictures and sounds mentioned above, it is necessary to utilize multiple decoders, D-A converters, display devices and reproducers equal in number to the moving pictures and the sounds, as shown in FIG. 19. Therefore, the apparatus is rendered great in both structure and scale to be consequently inadequate for general use in particular.

SUMMARY OF THE INVENTION

It is an object of the present invention to provide an improved multiple picture/sound signals decoding apparatus which is capable of simultaneously reproducing multiple moving pictures by a single display device and where the structure of such apparatus is reduced in scale.

According to one aspect of the present invention, there is provided an improvement in an apparatus for decoding input signals inclusive of multiple compression-coded moving picture signals and sound signals read out from a recording medium and also signals received via transmission lines. Such improved apparatus comprises a decoding means for curtailing the input picture signals at a predetermined interval to produce multiple picture signals reduced both horizontally and vertically, and decoding each of such multiple picture signals; frame memories connected to the decoding means; a means for displaying the multiple pictures on a single screen; and a means for controlling the operations of the decoding means and the display means.

In this decoding apparatus, the decoding means comprises a means for separating motion vectors from the input signals; a means for generating the reduced multiple picture signals; a means for reducing the motion vectors in conformity with the reduction rate of the picture signals; and a means for generating a predictive picture on the basis of the reduced picture signals and the reduced motion vectors.

Further in the decoding apparatus, the control means is capable of selecting, in response to a mode selection signal, a multiple moving picture mode for displaying the reduced multiple moving pictures on a single screen of the display means, or a single moving picture mode for displaying merely one of the multiple moving pictures on the single display means.

When the multiple moving picture mode is selected in such decoding apparatus of the present invention, the output of an inverse DCT is first reduced by means of a reducer both horizontally and vertically, and then is supplied to an adder. The number of frame memories required for decoding P and B frames need not be equal to the number of the moving pictures, and one frame memory is divided into a plurality of memories which are used independently of one another. The decoded moving pictures are supplied via display control means to a single display means where the moving pictures are displayed simultaneously. Meanwhile in the single moving picture mode, reduction of the multiple moving pictures is not executed, and one of such multiple moving pictures is decoded by the conventional known method and then is displayed on the display means.

The sound signals are switched in conformity with the selected mode.

The above and other features and advantages of the present invention will become apparent from the following description which will be given with reference to the illustrative accompanying drawings.

BRIEF DESCRIPTION OF THE DRAWINGS

FIGS. 4(a), 4(b) and 4(c) show how the storage space in a frame memory is divided for use in the apparatus of FIG. 1;

FIG. 6 is a block diagram showing the details of a multiple sound signals decoder employed in the apparatus of FIG. 1;

FIG. 10 is an explanatory diagram of an interframe motion predicting method based on the MPEG system;

FIG. 11 shows the kinds and the sequence of frames of moving pictures encoded in an apparatus of FIG. 16;

FIG. 12 is an explanatory diagram showing the sequence of frames decoded in the apparatus of FIG. 1 and also the sequence of frames stored in the frame memory;

FIG. 13 is another explanatory diagram showing the sequence of the frames decoded in the apparatus of FIG. 1 and also the sequence of frames stored in the frame memory;

FIG. 21 illustrates how a picture signal is reduced to ½ both horizontally and vertically.

DESCRIPTION OF THE PREFERRED EMBODIMENTS

Hereinafter exemplary embodiments representing the multiple picture/sound signals decoding apparatus of the present invention will be described in detail with reference to the accompanying drawings.

In the embodiments, the process of decoding multiple moving picture signals signifies an operation of reading out multiple kinds of moving pictures from a recording medium (such as optical disk, magneto-optical disk, magnetic disk or any other storage medium) or from a transmission line and decoding the read signals, and further includes an operation of dividing one kind of successive moving pictures into multiple signals and decoding such divided picture signals.

Figure 1:
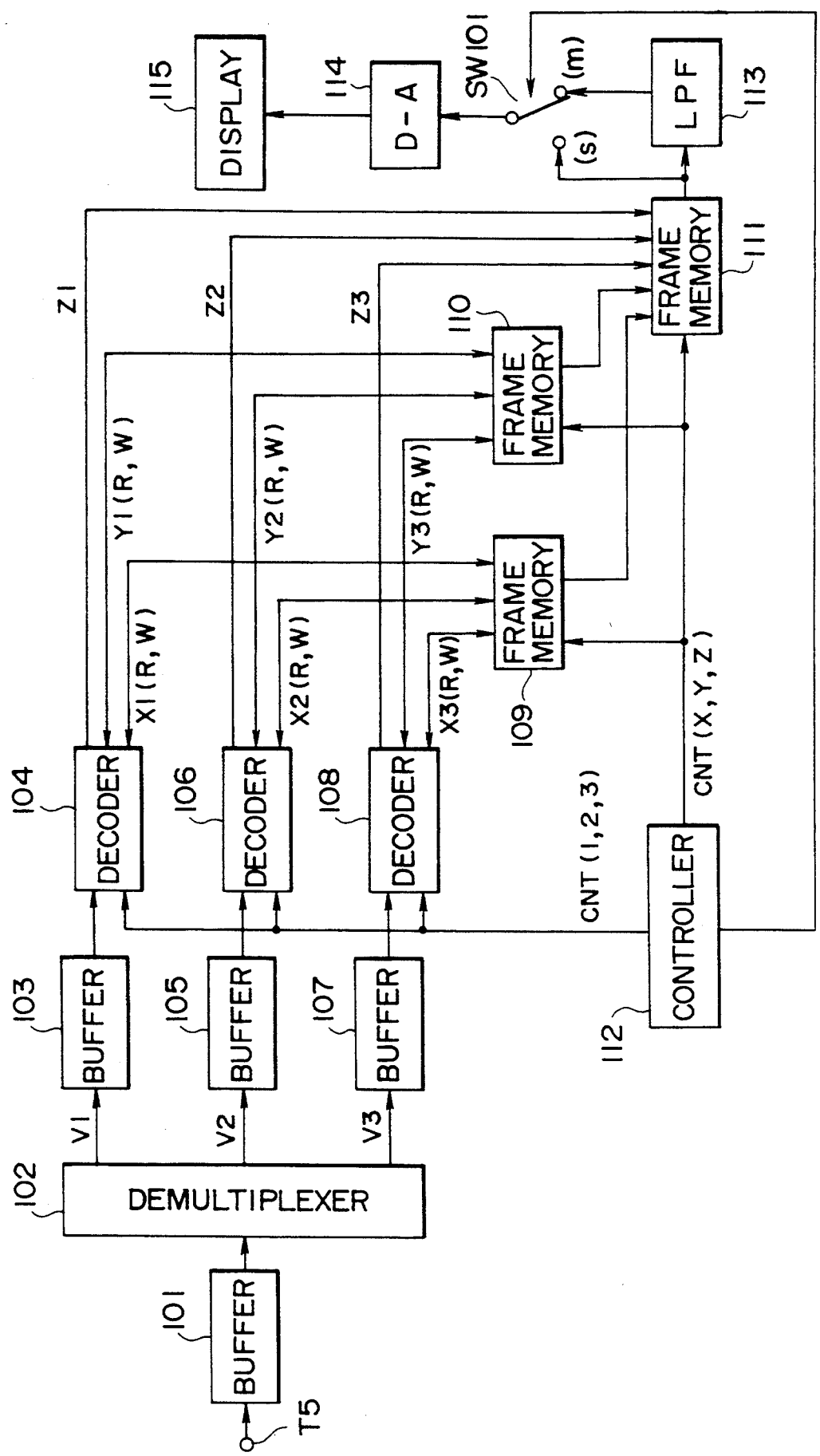
FIG. 1 is a block diagram of a first embodiment representing the multiple picture/sound signals decoding apparatus of the present invention.

FIG. 1 is a block diagram of a first embodiment representing the multiple picture/sound signals decoding apparatus of the present invention. This apparatus is capable of decoding three independent moving picture signals V1, V2, V3 and three independent sound signals A1, A2, A3, and has two display modes, i.e., a multiple moving picture mode and a single moving picture mode. (For the purpose of averting complication of the diagram, the sound signal decoding circuit is shown separately in FIG. 6.)

Figure 3:
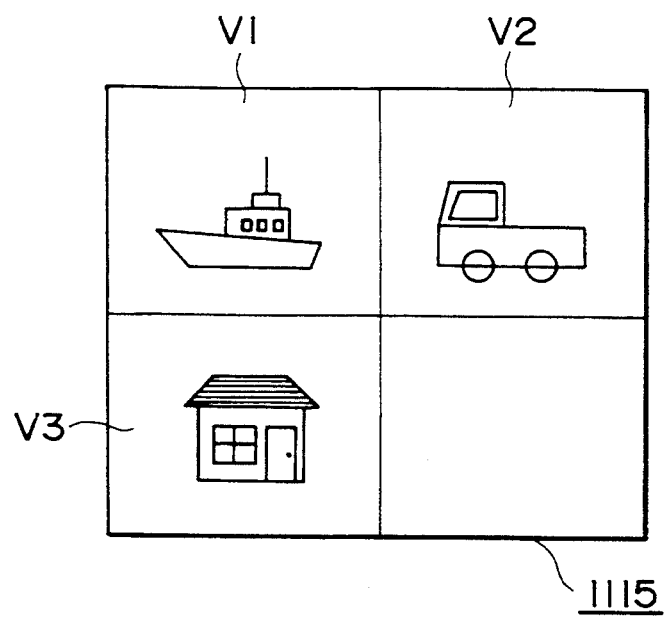
FIG. 3 illustrates an exemplary display state on a display screen in a multiple moving picture mode in the apparatus of FIG. 1.

In the multiple moving picture mode, the moving picture signals V1, V2, V3 are so processed that each picture is reduced to ½ both horizontally and vertically and is displayed in ¼ divided area of one whole screen as illustrated in FIG. 3. In this diagram, the lower right area is blank.

First a description will be given on the operation performed in the multiple moving picture mode.

The multiplexed picture/sound code inputted via a terminal T5 to a buffer 101 is supplied to an inverse multiplexer 102, where the input code is separated into moving picture signals and sound signals. (As mentioned, the sound processing circuit is shown in FIG. 6 so as to avert complication of the diagram.) The moving picture signals V1, V2, V3 thus separated are supplied to decoders 104, 106, 108 respectively.

Figure 2:
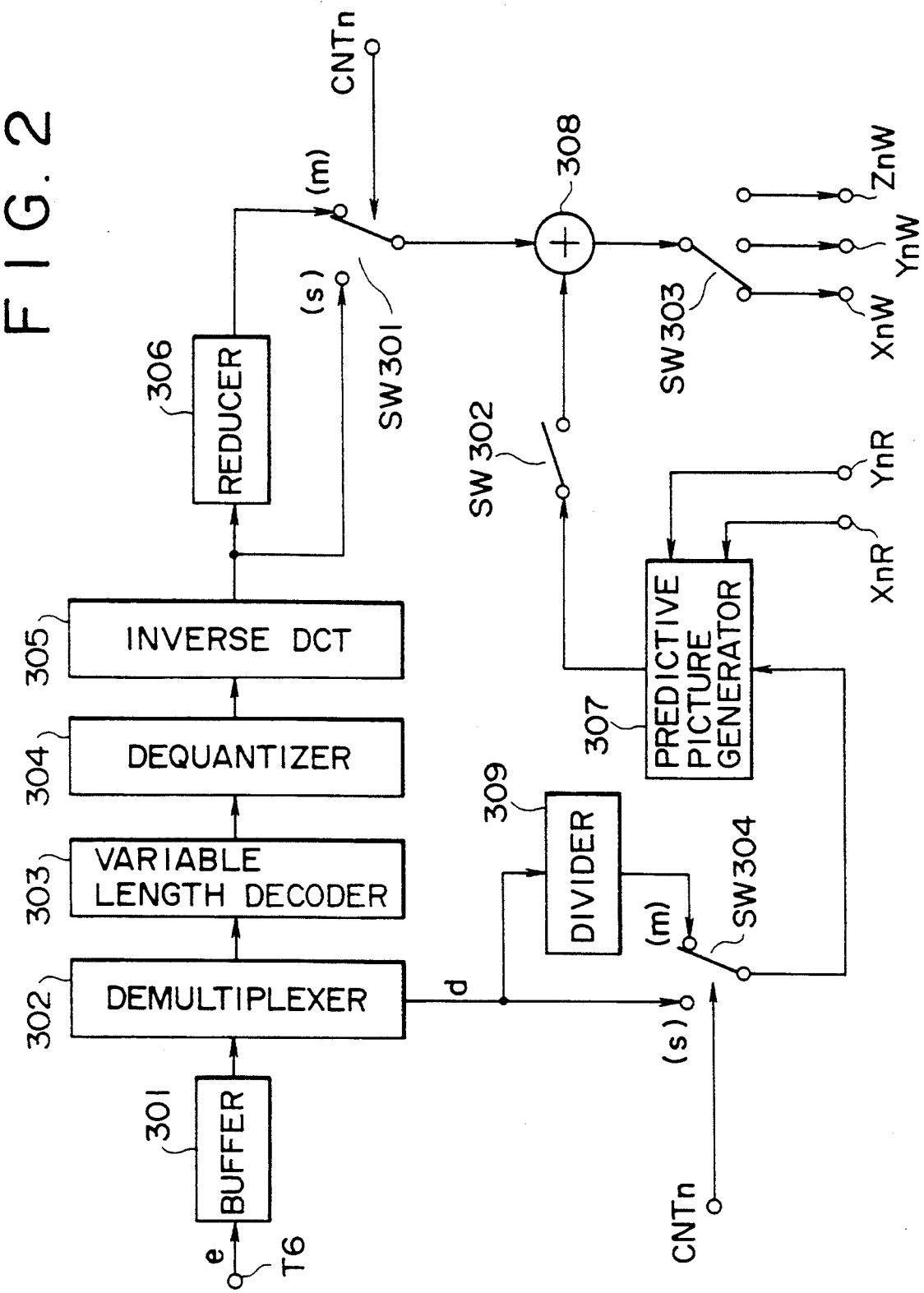
FIG. 2 is a block diagram showing the details of a decoder employed in the apparatus of FIG. 1.
Figure 20:
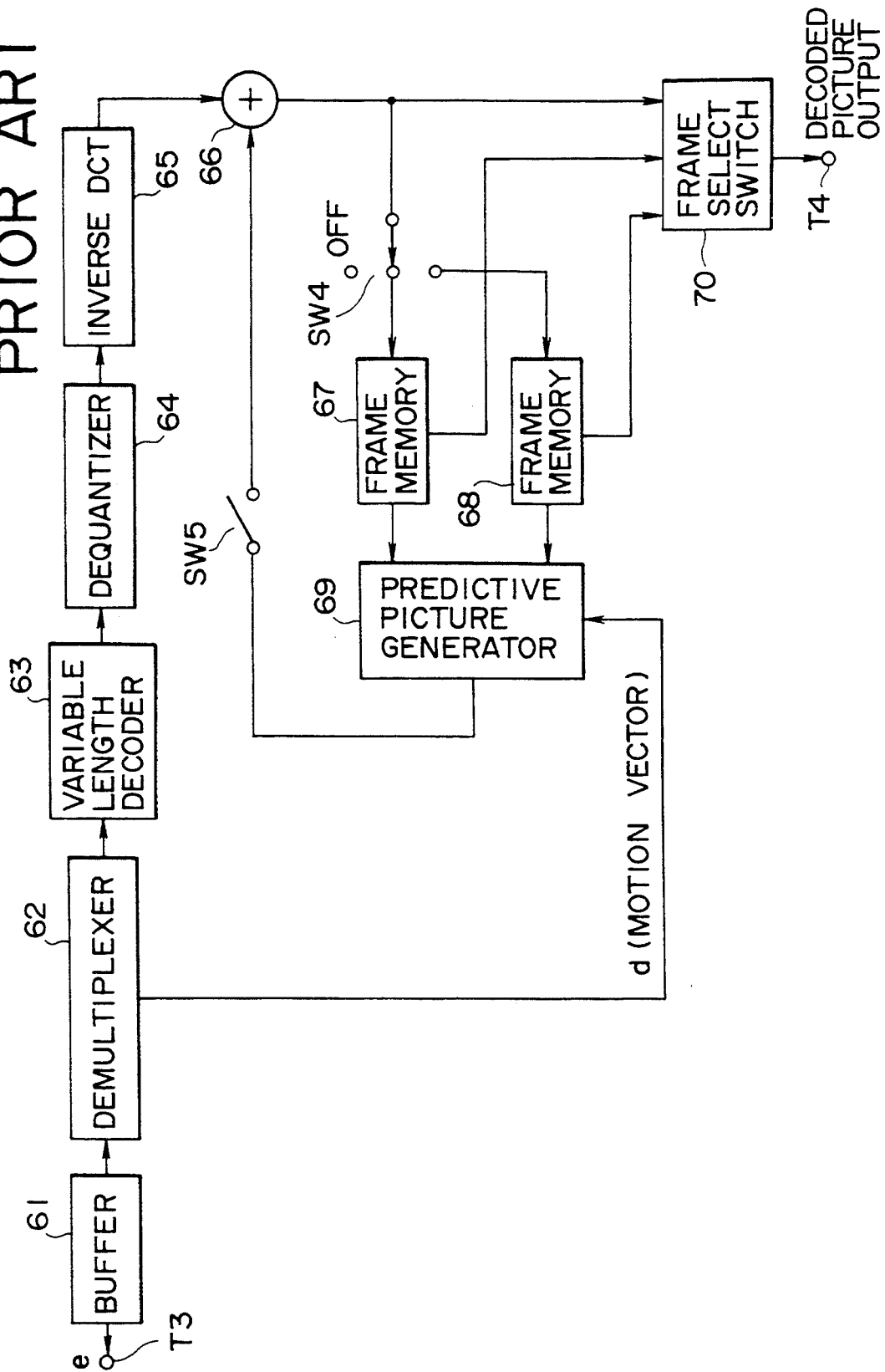
FIG. 20 is a block diagram showing the details of a decoder employed in the apparatus of FIG. 19.

FIG. 2 shows the details of each of the decoders 104, 106 and 108. The input signal e received at a terminal T6 is supplied via a buffer 301 to an inverse multiplexer 302, where the motion vector data d is separated. Subsequent processes executed sequentially in a variable length decoder 303, an inverse quantizer 304 and an inverse DCT 305 are exactly the same as those executed in the aforementioned decoder shown in FIG. 20. The output of the inverse DCT 305 is branched into two, and one is-supplied to a switch SW301 while the other to a reducer 306.

In the reducer 306, the pixels are curtailed alternately in the horizontal and vertical directions so that the picture signal is reduced to ½ both horizontally and vertically.

This process is illustrated in FIG. 21 where each circle denotes an individual pixel. The picture is reduced to ½ both horizontally and vertically by collecting the alternate pixels (denoted by hatched circles).

The switch SW301 is controlled by a signal CNT1 (n=1 in the decoder 104) obtained from the controller 112 shown in FIG. 1. In the multiple moving picture mode, the switch SW301 is connected to (m) so that the output of the reducer 306 is supplied to an adder 308.

Meanwhile the motion vector data d separated in the inverse multiplexer 302 is branched and supplied to a divider 309. In accordance with reduction of the picture signal to ½ in the horizontal and vertical directions, the motion vector data d is also reduced to a ½ value in the divider 309. On the basis of the motion vector (X, Y) (where X stands for the horizontal component of the motion vector and Y for the vertical component thereof), there is obtained a vector (X/2, Y/2) from the divider 309. Namely, the motion vector data is reduced in conformity with the reduction rate of the picture signal.

A switch SW304 is controlled also by the signal CNT1 similarly to the aforementioned switch SW301 and is connected to (m) in the multiple moving picture mode, whereby the output of the divider 309 is supplied to a predictive picture generator 307. A switch SW302 is closed in the P and B frames, so that a predictive picture outputted from the predictive picture generator 307 is added by an adder 308 to the output of the switch SW301. However, nothing is added to the I frame.

The output of the adder 308 is supplied to a switch SW303. The connection of the switch SW303 is alternately changed to terminals XnW and YnW every time the I and P frames are decoded, and it is connected to a terminal ZnW at the time of the B frame. The terminals XnW, YnW, ZnW are connected respectively to the frame memories 109, 110, 111 shown in FIG. 1, and the individual data of the three frames are stored in such memories respectively. (In FIG. 1, XnR and XnW are denoted by a single line Xn (R, W) for averting complication of the diagram.) Each of the frame memories 109, 110, 111 is divided into four similarly to the display screen, and the data are written in or read out from the divided storage spaces independently of one another.

FIGS. 4(a) to 4(c) show the storage spaces of the frame memories 109, 110, 111 in a manner that the pixel data stored in the memories coincide with the positions on the display screen. FIGS. 4(a), 4(b) and 4(c) represent the contents 1109, 1110 and 1111, respectively, of the X frame memory 109, the Y frame memory 110 and the Z frame memory 111, respectively.

Figure 22A:
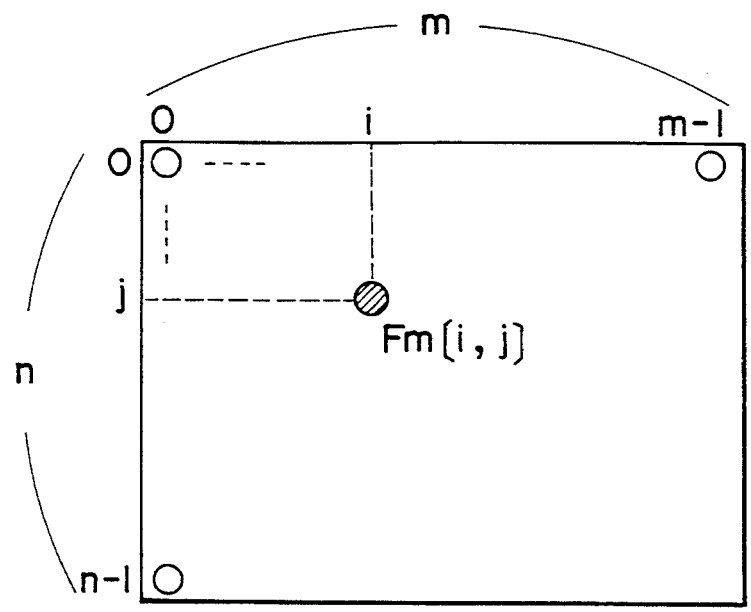
FIG. 22(A) and 22(B) schematically show pixels in one frame.
Figure 22B:
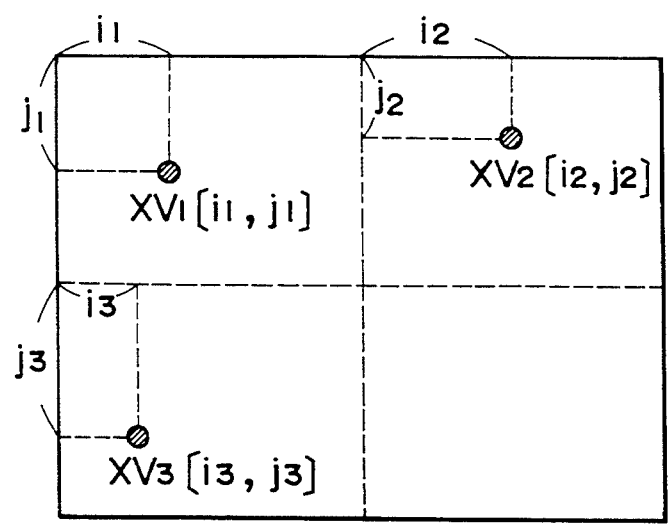

If one frame is composed of horizontal m pixels by vertical n pixels as shown in FIG. 22, each pixel can be expressed as $$Fm [i, j] \text{ where } 0 \leq i < m, 0 \leq j < n$$

In FIG. 4(a) for example, three kinds of pictures reduced to ½ both horizontally and vertically are stored in the areas XV1, XV2, XV3. The pixels in the individual pictures are expressed as $XV1\ [i1, j1]$ where $0 \leq i1 < m/2,\ 0 \leq j1 < n/2$ $XV2\ [i2, j2]$ where $0 \leq i2 < m/2,\ 0 \leq j2 < n/2$ $XV3\ [i3, j3]$ where $0 \leq j3 < m/2,\ 0 \leq j3 < n/2$ The following equations represent the positions in the frame memories where the pixels of the individual pictures are practically written.

$Fm\ [i1, j1] = XV1\ [i1, j1]$ $Fm\ [i2+m/2, j2] = XV2\ [i2, j2]$ $Fm\ [i3+m/2, j3+m/2] = XV3\ [i3, j3]$

In the divided areas XV1, XV2 and XV3, the picture data are written and read independently of one another in the same manner as in the individual different memories. The same operation is performed in the other memory areas YV and ZV as well. As obvious from FIGS. 1, 2 and 4, the data inputted from the terminal X1W is written in the memory space XV1 and is read out therefrom to the terminal X1R. The operation is the same with respect to X2, X3, Y and Z as well. In accordance with the method for prediction of the P and B frames, the decoded picture data obtained from the memories 109 and 110 are supplied via the terminals X1R, Y1R to the predictive picture generator 307, where a predictive picture is generated on the basis of the motion vector d and then is outputted to the switch SW302. (As mentioned, XnR and XnW are denoted by a single line Xn (R, W) in FIG. 1 for averting complication of the diagram.) Similar to the above example described with regard to the moving picture signal V1, it is to be understood that the same process is executed relative to the moving picture signals V2 and V3 independently of each other. With the exception that the picture signal is reduced to ½, the decoding process described above is the same as that executed in the decoder of FIG. 20. The decoded picture of the B frame obtained from the decoder 104 (106, 108) is written in the frame memory 111. Meanwhile the decoded pictures of the I and P frames to be displayed simultaneously with the B frame are read out from the frame memories 109, 110 and then are written in the frame memory 111.

Figure 16:
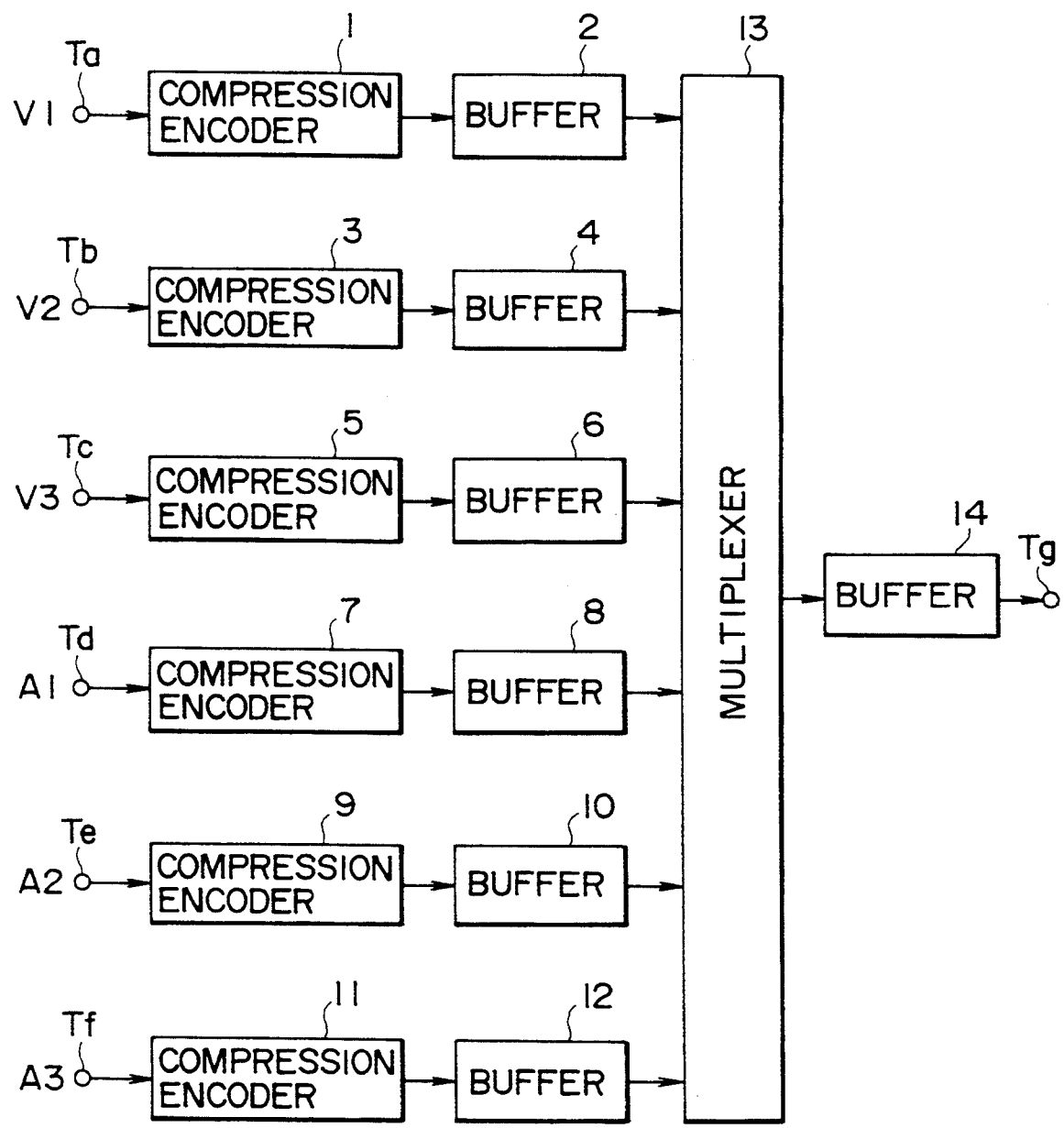
FIG. 16 is a block diagram of a general multiple picture/sound signals encoding apparatus.
Figure 17:
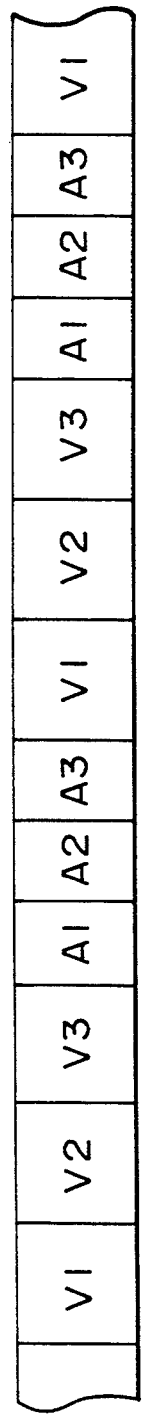
FIG. 17 shows an exemplary arrangement of coded data outputted from the multiple picture/sound signals encoding apparatus of FIGS. 16 and 18.
Figure 18:
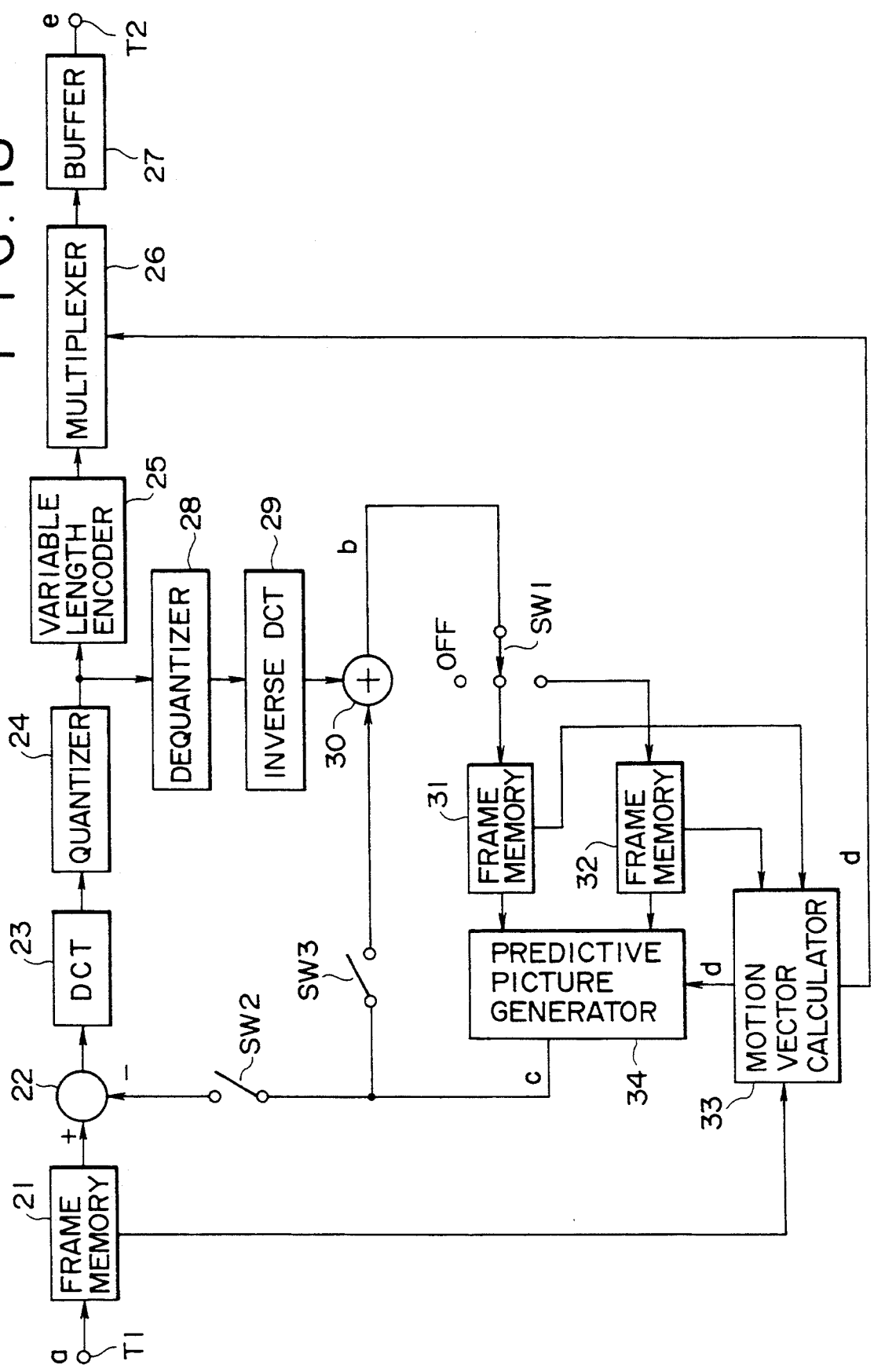
FIG. 18 is a block diagram showing the details of a compression encoder employed in the apparatus of FIG. 16.
Figure 19:
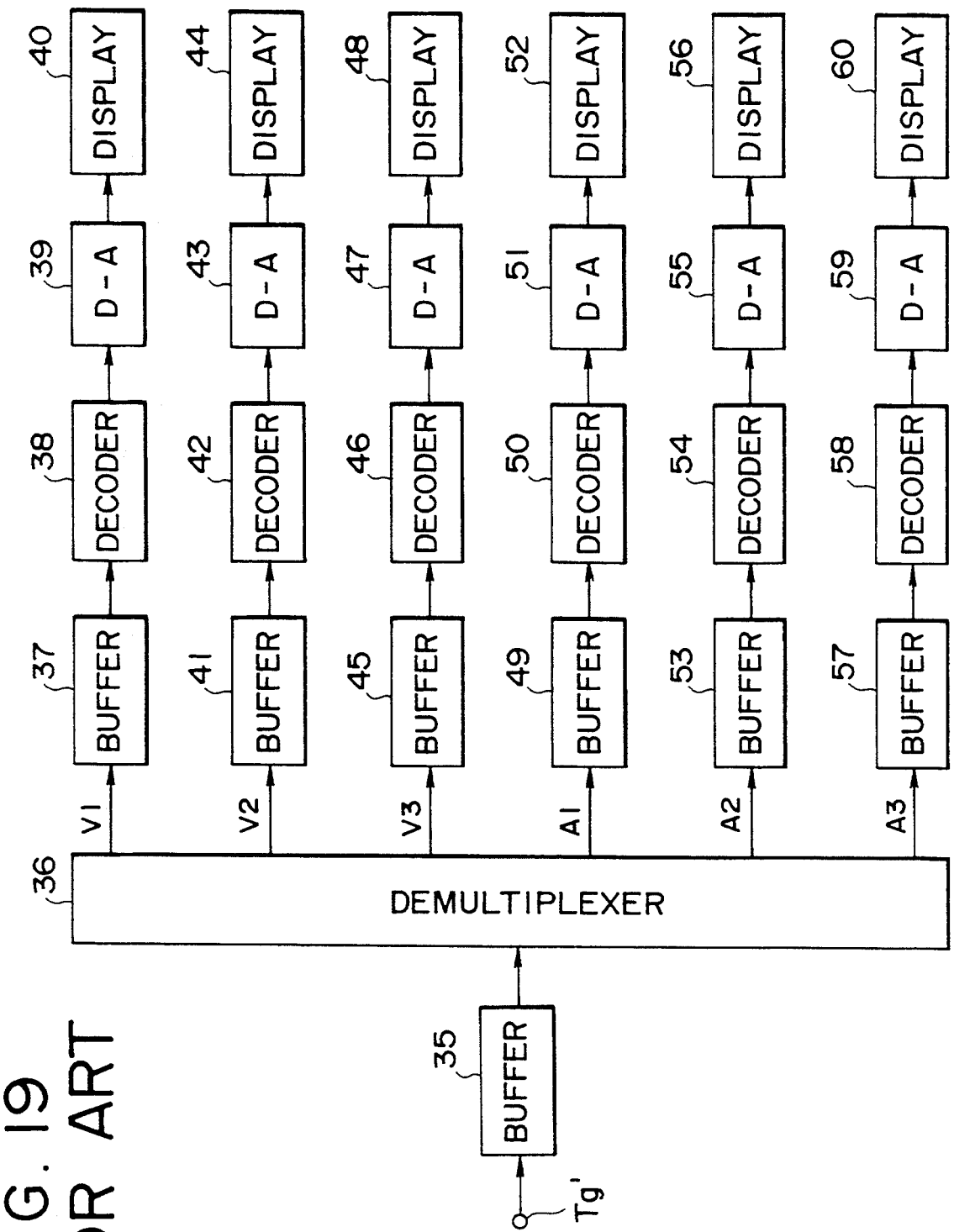
FIG. 19 is a block diagram of a conventional multiple picture/sound signals decoding apparatus.

Now the timing of inputting the picture signals into the frame memory 111 will be described below. FIG. 10 shows the sequence of allocation of the I, P and B frames relative to the input moving picture signals V1, V2, V3 in the encoding apparatus of FIG. 16. Since the moving picture signals V1, V2, V3 are mutually independent, the sequence of the I, P, B frames is not exactly coincident therewith. However, a coincidence in the sequence of the frames is preferable for the reason that the algorithm required for generating a predictive picture by dividing each frame memory can further be simplified.

FIGS. 11 to 13 show the decoding sequence and the storage sequence of the picture data in the frame memories 109 and 110. The V1 decoding of FIG. 11 represents the sequence of decoding the I, P, B frames in the output signal of the adder 308 in FIG. 2. In FIG. 11, XV1 and YV1 signify the sequence of storing the data of the I and P frames in XV1 of the frame memory 109 and YV1 of the frame memory 110, respectively. In FIGS. 12 and 13, V2 and V3 represent the same decoding sequence.

Figures 14, 15:
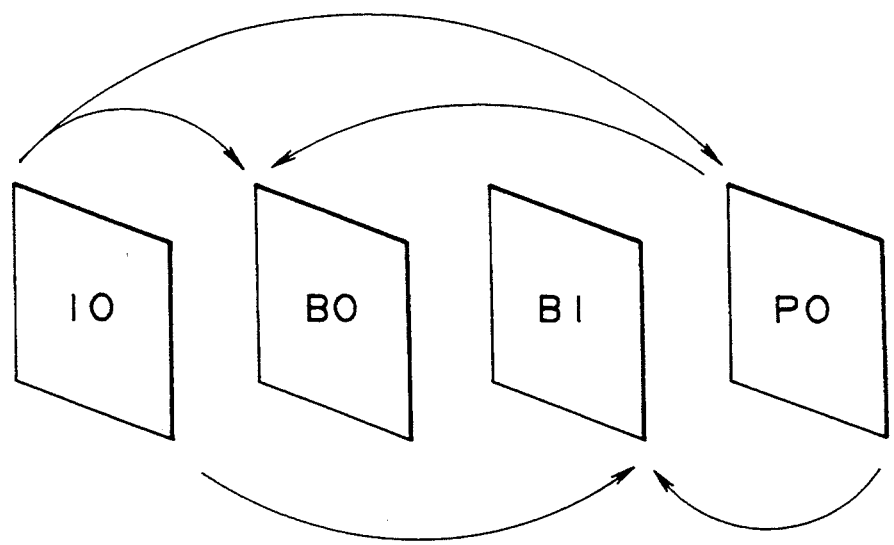
FIG. 14 is a further explanatory diagram showing the sequence of the frames decoded in the apparatus of FIG. 1 and also the sequence of frames stored in the frame memory.
FIG. 15 shows the sequence of frames stored in the frame memory.

ZV1, ZV2, ZV3 in FIG. 14 signify the sequence of storing the data in ZV1, ZV2, ZV3 of the frame memory 111 respectively.

In an exemplary case of inputting the frame No. 4, P4 is read out from XV1 and is written in ZV1, and also I4 is read out from XV3 and is written in ZV3. Meanwhile B4 obtained from the decoder 106 of FIG. 1 is loaded directly in ZV2 via the signal line Z2.

As the frames of the same number are thus inputted into the frame memory 111, the frames are rearranged to resume the sequence shown in FIG. 10, i.e., the frame sequence of the original pictures prior to the encoding, and the rearranged data is outputted to an LPF 113 and a switch SW101 shown in FIG. 1.

The above operation is controlled by control signals CNT (1, 2, 3) and CNT (X, Y, Z) outputted from the controller 112.

The LPF 113 is a low pass filter for eliminating the noise caused by the curtailment executed in the reducer 306 shown in FIG. 2, and its operation is performed in both horizontal and vertical directions of the screen. The switch SW101 is connected to (m) in the multiple moving picture mode, and the output signal of the LPF 113 is supplied to a D-A converter 114 where digital-to-analog conversion is executed. The analog signal thus obtained is then supplied to a display device 115, where three reduced pictures are displayed as illustrated in FIG. 3. (Denoted by 1115 in FIG. 3 is a screen of the display device 115.)

Hereinafter the operation in the single moving picture mode will be described.

Suppose now that the picture signal V1 is selected in the single moving picture mode. Then the switch SW301 incorporated in the decoder 104 is connected to (s) so that a nonreduced normal picture signal is decoded. Similarly the switch SW304 is connected also to (s), so that a nondivided former motion vector data d is inputted to the predictive picture generator 307.

The frame memories 109 and 110 are not divided differently from FIG. 4, and each serves as a single whole frame memory. Therefore, each frame memory functions in the same manner as in the decoder shown in FIG. 20. Namely, the frame memory 109 functions like the frame memory 67 in FIG. 20, and the frame memory 110 like the frame memory 68, respectively. Meanwhile the frame memory 111 is functionally the same as the frame selection switch 70 in FIG. 20. The switch SW101 is connected to (s), and the output signal from the frame memory 111 is supplied via the D-A converter 114 to the display device 115 without being passed through the LPF 113.

Figure 5:
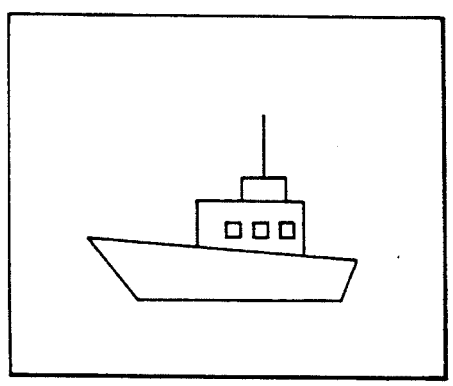
FIG. 5 illustrates an exemplary display state on a display screen in a single moving picture mode in the apparatus of FIG. 1.

On the screen of the display device 115, the picture of the signal V1 is displayed in a normal size as illustrated in FIG. 5.

The actions of the switches and so forth executed in accordance with selective switchover of the operation modes is performed by the controller 112. The control signal (mode selection signal) used for controlling the switches and so forth may be selectively generated with depression of an external switching button or the like by a user to select a desired mode. It is also possible to preset the switching condition by the user in a manner to switch the operation mode at a predetermined time interval of, e.g., 10 minutes or so.

FIG. 6 shows an exemplary sound decoding apparatus. The sound signal A1 separated in an inverse multiplexer 102 is inputted via a buffer 203 to a decoder 204 and then is supplied to a selector 209. The other sound signals A2 and A3 are also processed in the same manner. In the multiple moving picture mode, the selector 209 selects desired ones of the sound signals A1, A2, A3 in response to a control signal (mode selection signal) obtained from a controller 112. Meanwhile in the single moving picture mode, the selector 209 selects the sound signal of the selected moving picture. The selected sound signal is supplied to a D-A converter 210 and then is reproduced by a reproducer which consists of an amplifier 211 and a speaker 212.

Figure 7:
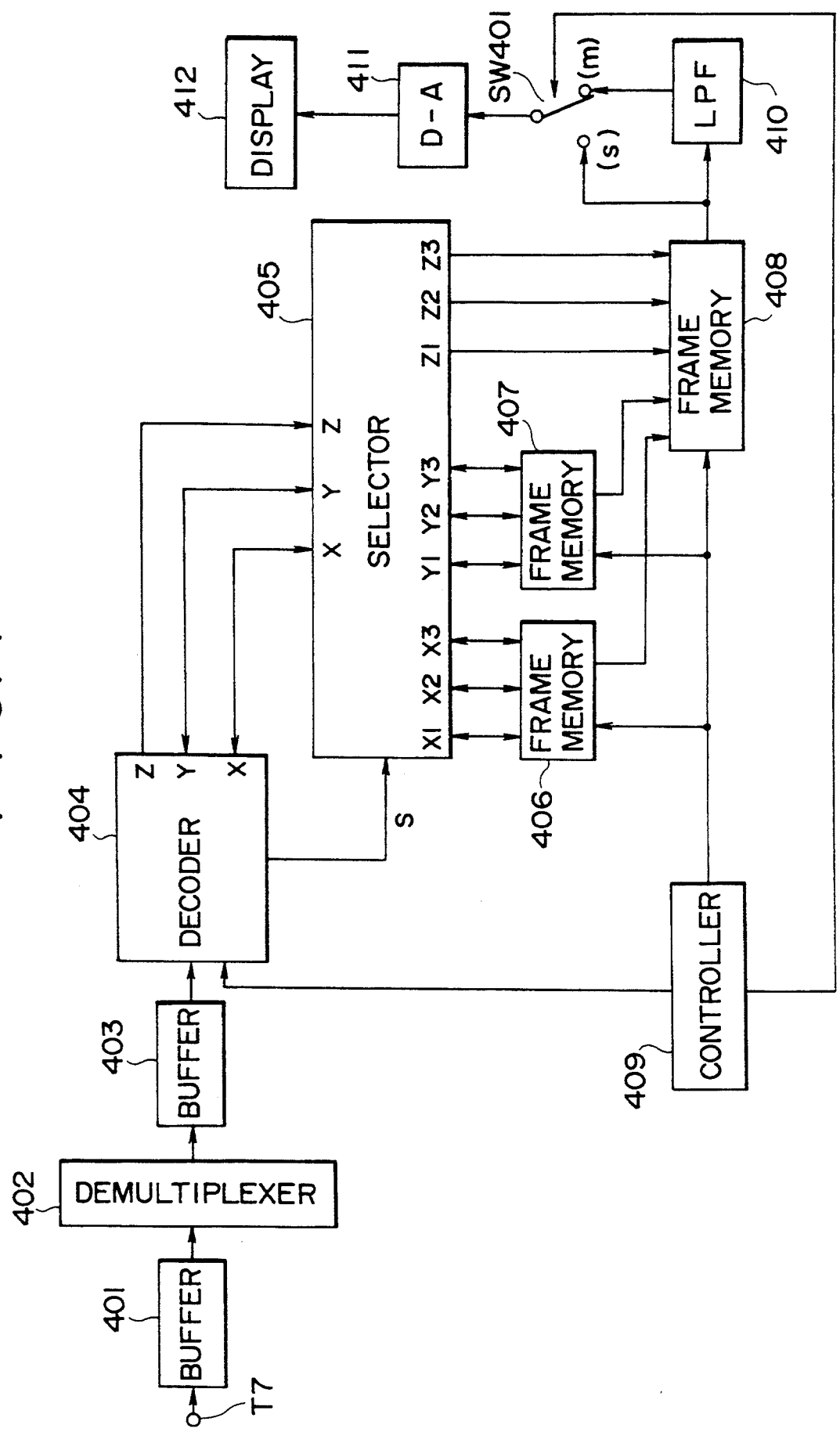
FIG. 7 is a block diagram of a second embodiment representing the multiple picture/sound signals decoding apparatus of the present invention.

Hereinafter a second embodiment of the present invention will be described. When the signal decoding speed of the decoders 104, 106, 108 in FIG. 1 is sufficiently high, it is not necessary to provide a decoder for each channel, and multiple moving pictures can be decoded by means of a single decoder through a time division process. The detail of such second embodiment is shown in FIG. 7 (where X1W and X1R are denoted simply by X1 for averting complication of the diagram).

Figure 8:
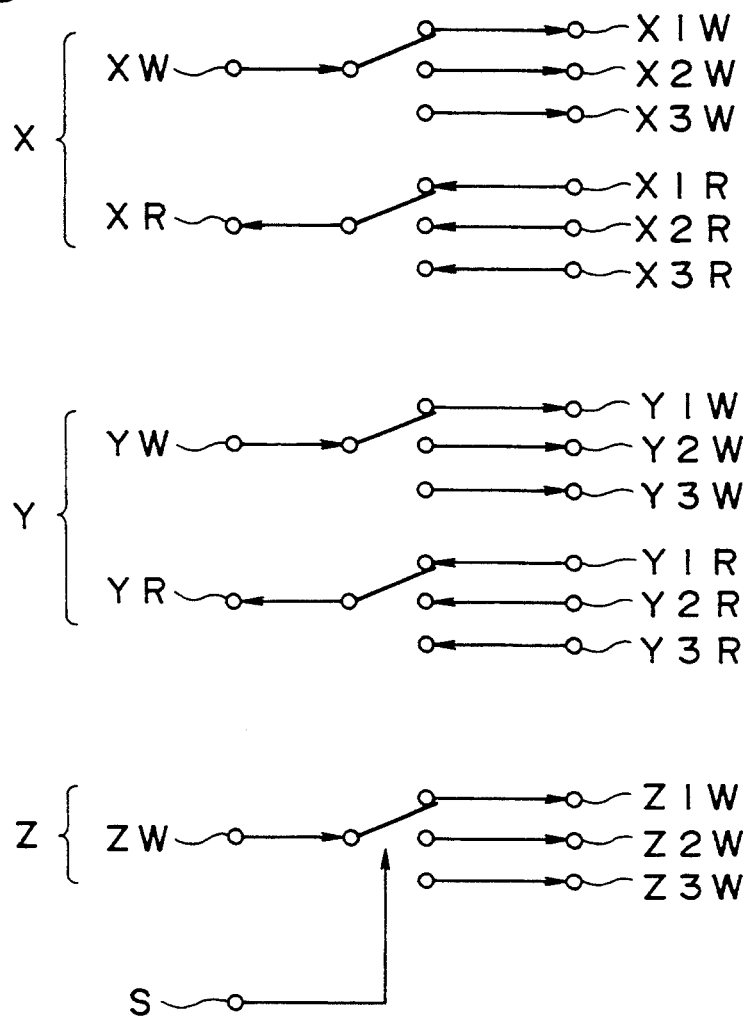
FIG. 8 is a connection diagram showing the details of a selector employed in the apparatus of FIG. 7.

As in the decoding apparatus of FIG. 1, the input signal from a terminal T7 is supplied via a buffer 401, an inverse multiplexer 402 and a buffer 403 to a decoder 404. This decoder 404 is the same in of the same structure as the aforementioned decoder shown in FIG. 2. Picture signals V1, V2, V3 decoded by the decoder 404 are time-divided and outputted sequentially from terminals X, Y, Z thereof. The output signals thus obtained are then delivered to a selector 405. The selector 405 is so constituted as shown in FIG. 8, where the connection to frame memories 406, 407, 408 is selectively changed in accordance with the decoded moving picture signals V1, V2, V3 by a control signal s obtained from the decoder 404. For example, when the data is the moving picture signal V1, XW is connected to X1W, XR to X1R, YW to Y1W, YR to Y1R, and ZW to Z1W, respectively.

The subsequent processes are exactly the same as those described with regard to the decoding apparatus of FIG. 1. In case the processing speed of the decoder is sufficiently high, the structure of FIG. 7 is also capable of achieving the same function as that of FIG. 1.

The description given hereinabove is concerned with an exemplary case of moving pictures of three channels. However, it is to be understood that the apparatus mentioned is capable of complying with moving pictures of any number of channels merely by changing the division of the frame memories and the reduction rate of the decoded pictures.

For example, pictures reduced to ⅓ in the horizontal and vertical directions can be obtained by curtailing every third pixel in FIG. 21 instead of alternate pixels. And if the frame memory is equally divided into three both horizontally and vertically, a maximum of 9-channel pictures can be simultaneously decoded and displayed.

Although the above description has been given with regard to an example of the MPEG system, the present invention is applicable also to any other picture compression system which performs motion prediction.

In the multiple moving picture display mode, it is not exactly necessary to display the entire input moving pictures on the screen, and the user may select merely desired ones for display.

Figure 9:
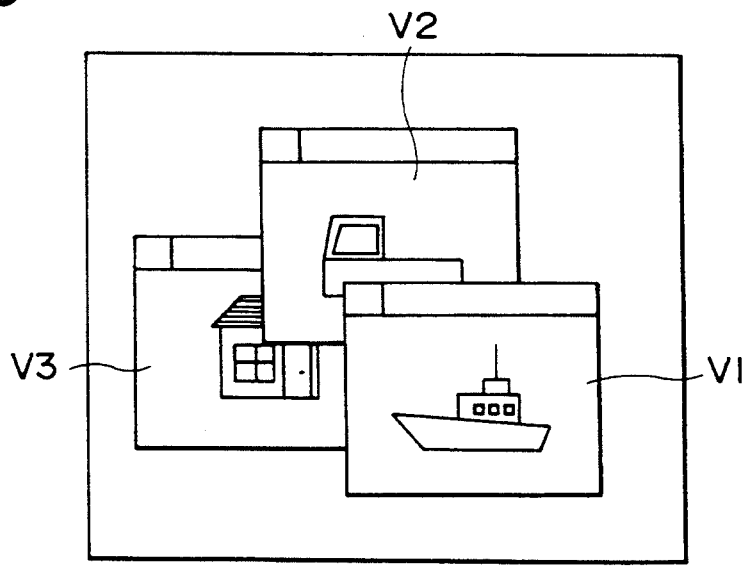
FIG. 9 illustrates another exemplary display state on a display screen in a multiple moving picture mode in the apparatus of FIG. 1.

In addition to the above example relative to the method of displaying multiple moving pictures simultaneously by dividing the screen into multiple areas as illustrated in FIG. 3, there may be adopted another method that uses multiple windows for displaying the pictures. According to such method, the individual pictures are displayed in respective windows, and any desired picture can be selected by employing functions of opening, closing, displacing, enlarging and reducing the windows. FIG. 9 shows a method of displaying multiple moving pictures with such windows.

As mentioned hereinabove, when multiple moving pictures are simultaneously reproduced in the multiple picture/sound signals decoding apparatus of the present invention, the moving picture signals are decoded with horizontal and vertical reduction, so that the required frame memories need not be equal in number to the moving pictures, and merely one set of frame memories are sufficient for decoding the signals. Since the display screen is divided for displaying multiple moving pictures, the provision of a single display means meets the requirement. Thus, it becomes possible to minimize the number of the frame memories and the display means to consequently diminish the scale of the structure of the multiple picture/sound signals decoding apparatus.

Furthermore, either multiple moving pictures or a single one thereof can be selectively displayed due to switchover of the picture display modes.

What is claimed is:

1. An apparatus for decoding multiple moving picture input signals and multiple sound input signals read out from a recording medium or those received via transmission lines, said apparatus comprising:
    decoding means for curtailing the decoded multiple moving picture input signals at a predetermined interval to produce horizontally and vertically reduced multiple picture signals, the decoding means comprising means for separating motion vectors from the multiple moving picture input signals, means for generating the reduced multiple picture signals, means for reducing the motion vectors in conformity with the reduction rate of the picture signals and means for generating a predictive picture on the basis of the reduced picture signals and the reduced motion vectors;
    frame memories connected to said decoding means;
    display means for simultaneously displaying the reduced multiple pictures corresponding to the reduced multiple picture signals stored in the frame memories; and
    means for controlling the operations of the decoding means and the display means.

2. The apparatus according to claim 1, wherein said control means is capable of selecting, in response to a mode selection signal, a multiple moving picture mode for displaying the reduced multiple moving pictures simultaneously on a single screen of said display means, or a single moving picture mode for displaying merely one of the multiple moving pictures on the screen of said display means.

3. The apparatus according to claim 2, wherein, when the selected display mode is a multiple moving picture mode, said control means divides said frame memories into multiple storage spaces and using such spaces independently of one another for generation of predictive pictures.

4. The apparatus according to claim 2, wherein said mode selection signal is generated in response to a manipulation of an external means performed by a user for selecting a desired mode.

5. The apparatus according to claim 2, wherein said mode selection signal is generated in conformity with the mode switching condition preset in advance.

6. The apparatus according to claim 1, wherein said display means displays the multiple moving pictures in multiple windows.

7. The apparatus according to claim 3, wherein said mode selection signal is generated in response to a manipulation of an external means performed by a user for selecting a desired mode.

8. The apparatus according to claim 3, wherein said mode selection signal is generated in conformity with the mode switching condition preset in advance.

9. The apparatus according to claim 1, wherein said decoding means is a first decoding means, further comprising:
   second decoding means for decoding the multiple sound input signals;
   selection means responsive to a control signal from the means for controlling, the selection means operative to select at least one decoded sound signal corresponding to a displayed picture; and
   reproduction means for reproducing the selected decoded sound signal.

10. The apparatus according to claim 2 wherein said decoding means is a first decoding means, further comprising:
   second decoding means for decoding the multiple sound input signals;
   selection means responsive to a control signal from the means for controlling. The selection means operative to select at least one decoded sound signal corresponding to a displayed picture when the display means simultaneously displays reduced multiple pictures and to select one decoded sound signal corresponding a displayed multiple moving picture when the control means selects a single moving picture mode; and
   reproduction means for reproducing the selected decoded sound signal.

* * * * *